April 28, 1964

F. D. LOVELL ETAL 3,130,794

EARTH SHAPING IMPLEMENT

Filed July 5, 1961

FORD D. LOVELL
MARVIN WEIDENBACH
INVENTORS
HUEBNER & WORREL
ATTORNEYS

BY Richard M. Worrel

April 28, 1964  F. D. LOVELL ETAL  3,130,794
EARTH SHAPING IMPLEMENT
Filed July 5, 1961  3 Sheets-Sheet 2

FORD D. LOVELL
MARVIN WEIDENBACH
INVENTORS
HUEBNER & WORREL
ATTORNEYS
BY Richard M. Worrel

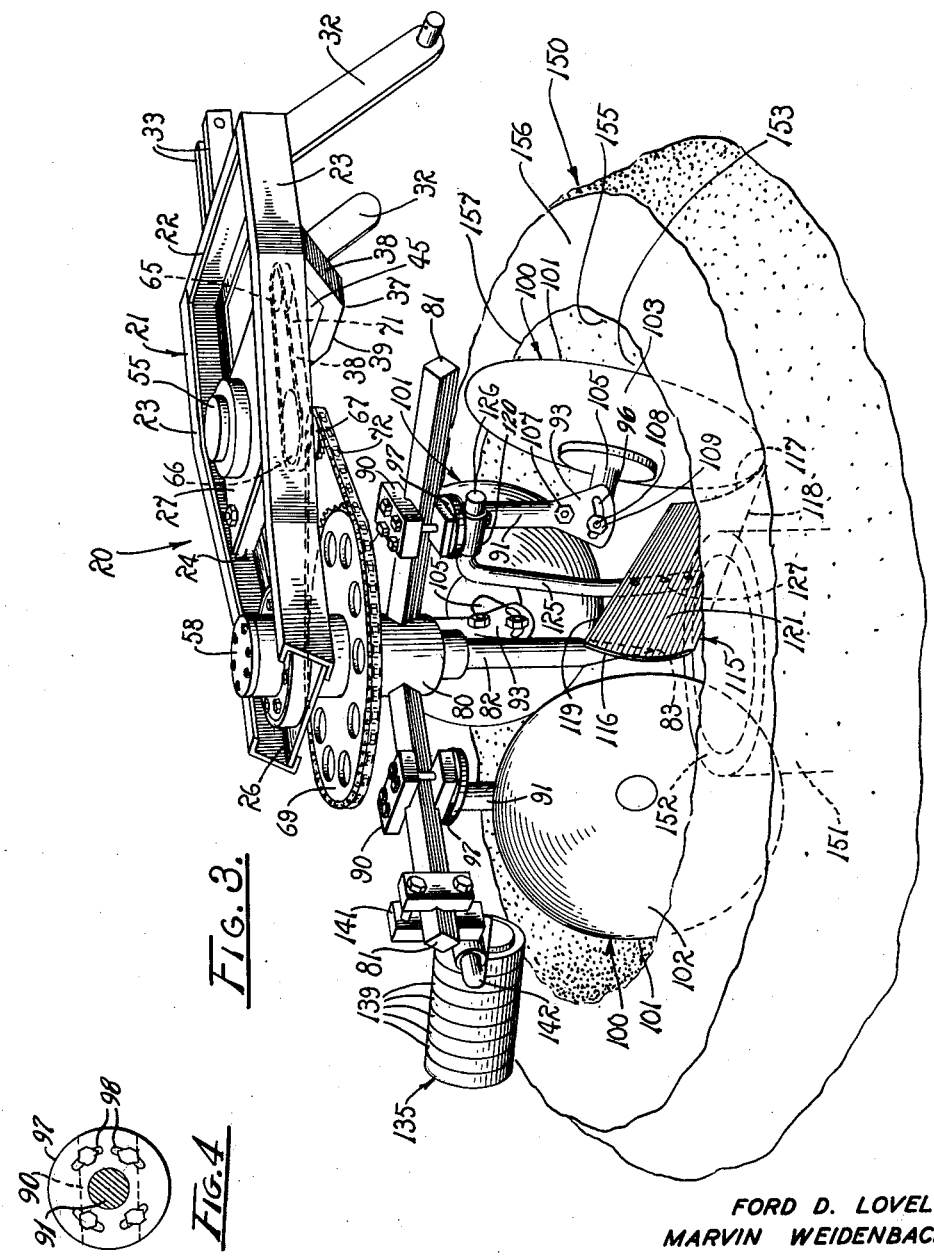

3,130,794
EARTH SHAPING IMPLEMENT
Ford D. Lovell, 314 Golden West, and Marvin Weidenbach, 357 Atlantic, both of Shafter, Calif.
Filed July 5, 1961, Ser. No. 124,296
4 Claims. (Cl. 172—51)

The present invention relates to an earth shaping implement and, more particularly, to an agricultural implement for forming a basin or reservoir in the ground and a ridge of earth in circumscribing relation to the basin.

In irrigated agricultural areas, it is conventional to conduct water from a valve riser, or standpipe, in the ground through a ditch and from the ditch into levees provided in the field of growing crops. The valve risers are usually located along an edge of the field and provide upper open ends just above the surface of the ground. The risers may be spaced linearly at varying distances depending upon the type of irrigation system installed in the field as well as the type of crops being cultivated. As an example of the linear spacing, the risers are spaced about twelve feet apart in the case of vineyards, and with other crops such as cotton, the spacing may extend to a distance of forty-eight feet and greater. It is desirable to form a basin or a reservoir known in the art as a ducknest around the open end of each standpipe for receiving water from the standpipe. Each time the described irrigation system has been set up in the past, therefore, it has been necessary manually to shovel and to pack dirt into a circular ridge, and/or to dig out a basin in the ground, in circumscribing relation to the open end of each standpipe. A channel is usually cut in the ridge of dirt and between the basin and the adjacent ditch for allowing water in the basin to flow into the ditch.

There are other instances where such water reservoirs are required. For example, in planting young trees, the trees must be promptly supplied with water. To achieve this objective, it has been the practice to provide a ridge of dirt around the plant hole prior to setting the tree in the hole. As in the above described irrigation system, these ridges have also been formed by hand labor. Obviously, this method of providing a reservoir is tedious, time consuming, and expensive. The essence of the subject invention is the provision of an implement for forming such reservoirs by machine.

Accordingly, it is an object of the present invention to provide an improved earth shaping implement.

Another object is to provide an agricultural implement for forming a basin, or reservoir in the ground and a ridge of earth in circumscribing relation to the basin.

Another object is to provide an implement which forms, shapes, and smooths an annular ridge of dirt in circumscribing relation to a basin.

Another object is to provide such an implement which packs the dirt in the ridge with sufficient compactness to enable water to be retained in the basin formed within the ridge.

Another object is to minimize the labor, expense, and time normally involved in manually forming irrigation basins.

Another object is to provide an earth shaping implement of the type described which can be centered over an irrigation valve riser, a tree planting hole, or other reference center around which it is desired to provide an annular ridge of dirt.

Another object is to provide an implement of the type described which may be readily mounted on a conventional three-point tractor hitch and which may be operated from the power take-off of the tractor.

Other objects are to provide an earth shaping implement which is easy to operate, dependable in action, and durable in construction.

These, together with other objects, will become more fully apparent upon reference to the following description and accompanying drawings.

In the drawings:

FIG. 3 is a perspective view of the implement and ridge of earth illustrated in FIGS. 1 and 2.

FIG. 4 is a bottom plan view taken from a position indicated by the arrows 4—4 in FIG. 2.

Figure 1:
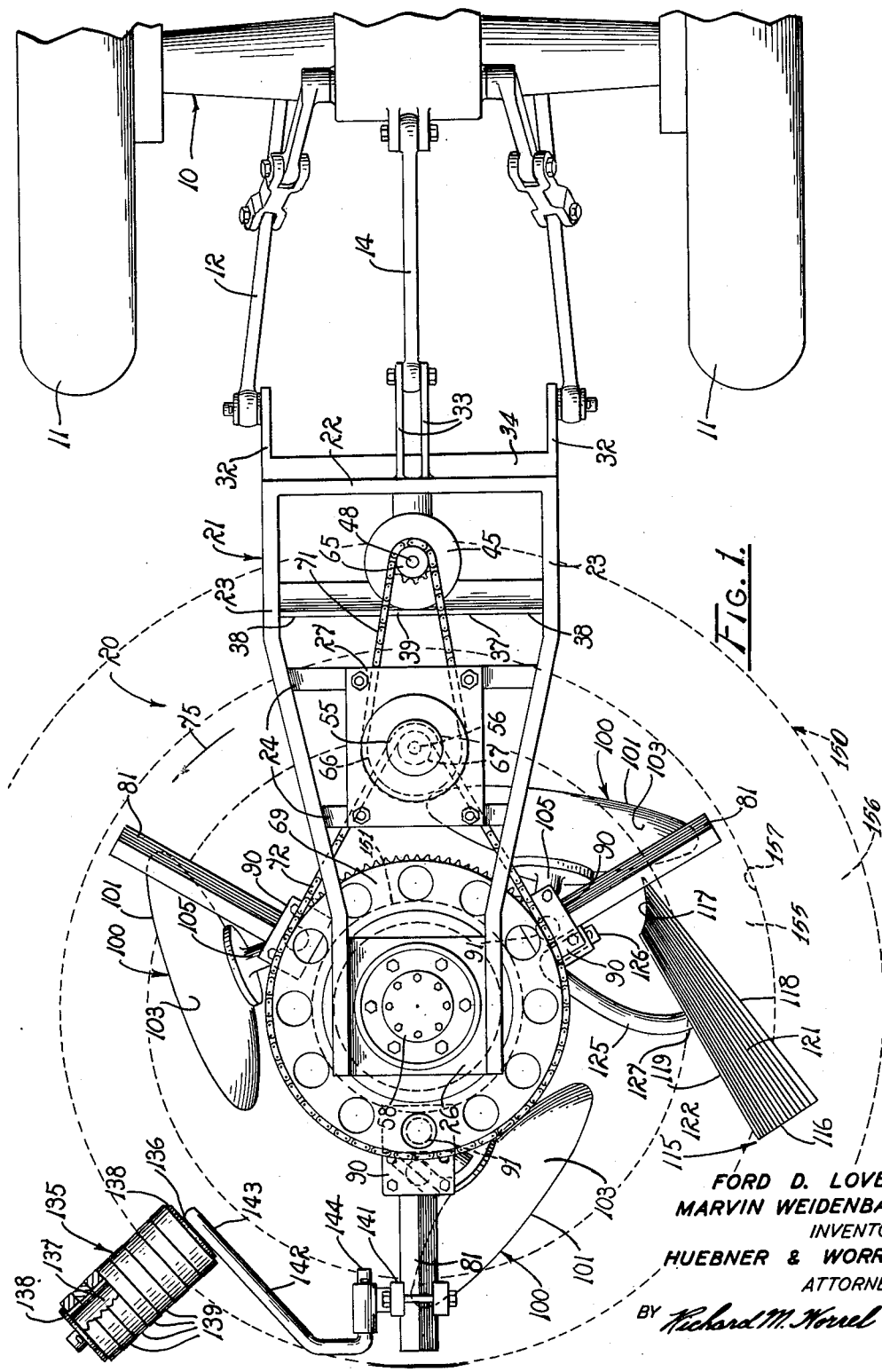
FIG. 1 is a top plan view of an implement embodying the principles of the present invention, a portion of a tractor to which the implement is connected, and of a ridge of earth formed by the implement.
Figure 2:
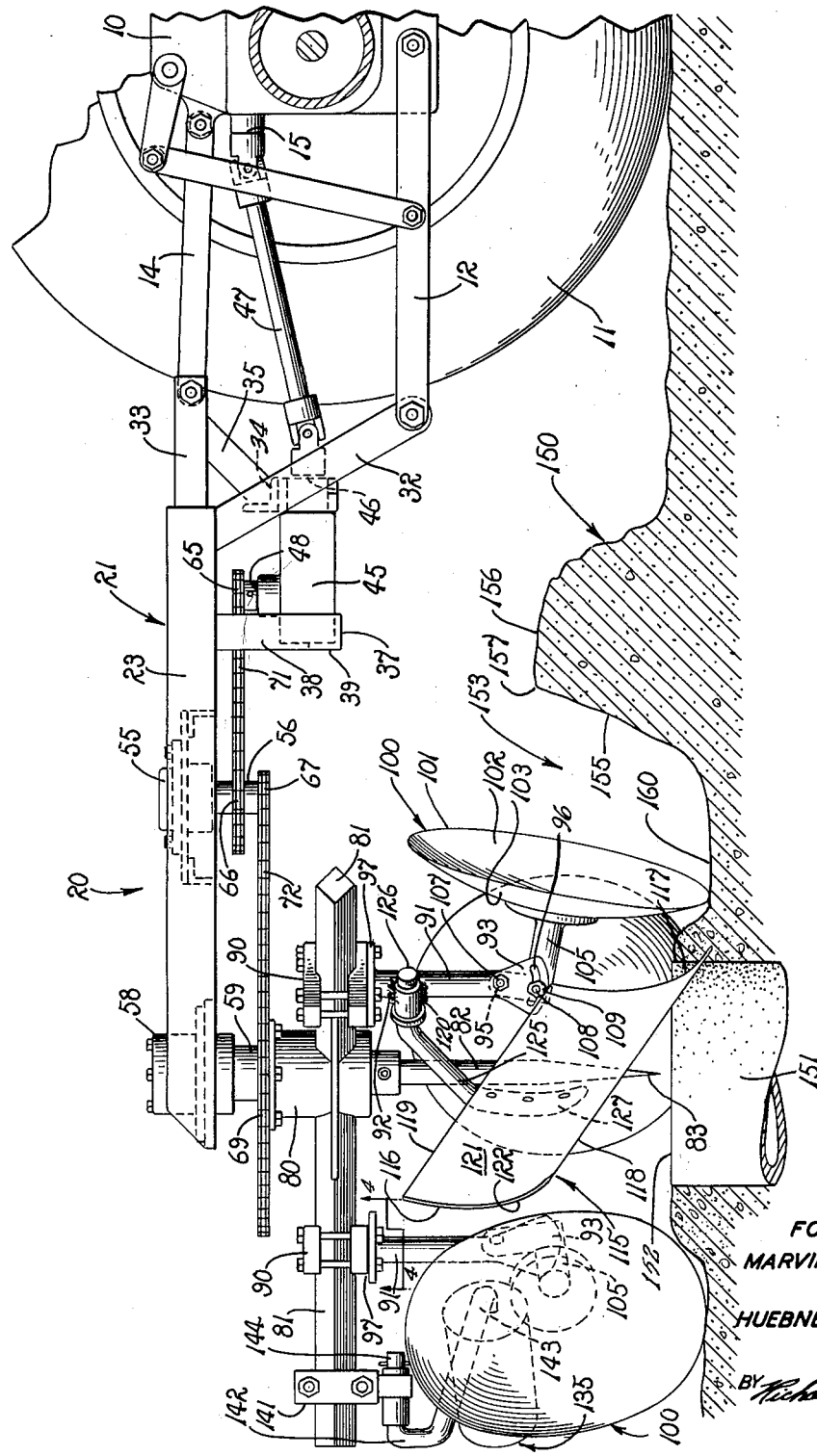
FIG. 2 is a side elevation of the implement, a portion of the tractor, and the ridge of earth, substantially as illustrated in FIG. 1.

Referring more particularly to the drawings, a portion of a tractor is generally indicated by the numeral 10 in FIGS. 1 and 2. The tractor is provided with rear wheels 11, rearwardly extended, elevationally adjustable lift arms 12, an upper rearwardly extended stabilizing linkage 14, and a power take-off shaft 15 located between the linkage and the lift arms. This construction is well-known in the art and no further description thereof is here provided.

An earth shaping implement embodying the principles of the present invention is generally identified by the numeral 20. The implement includes an elongated frame 21 providing a front transverse member 22, a pair of longitudinal side members 23 rigidly connected to the front member and rearwardly convergently extended therefrom, intermediate frame members 24 rigidly interconnecting the side members, a rear plate 26 rigidly interconnecting rearward ends of the side members, and an intermediate plate 27 rigidly interconnecting the intermediate frame members.

The frame 21 also includes support arms 32 rigidly, angularly downwardly extended from the side members 23 and pivotally connected to the lift arms 12 of the tractor 10. A tongue 33 is rigidly forwardly extended from the front member 22 and is pivotally connected to the stabilizing linkage 14. A bar 34 rigidly interconnects the support arms transversely of the frame 21, and a brace 35 diagonally interconnects the tongue and the bar intermediate the arms. A U-shaped bracket 37 includes a pair of side portions 38 downwardly convergingly extended from the side members of the frame and a central portion 39 rigidly interconnecting the side portions in downwardly spaced relation to the side members and in rearwardly spaced relation to the support arms.

A gear box 45 is rigidly supported on the central portion 39 of the bracket 37 and the transverse bar 34, and is extended longitudinally of the frame 21. The gear box includes a substantially horizontal, longitudinally forwardly extended input shaft 46 rotatably coupled to the power take-off shaft 15 by an elongated coupling shaft 47 and an upstanding output shaft 48 in driven relation with the input shaft, as by suitable bevel gears, not shown, within the gear box.

An intermediate, axially upright bearing 55 is mounted in the intermediate plate 24, and an intermediate shaft 56 is journaled in an upstanding position in the bearing. Similarly, a rear bearing 58 is supported in the rear plate 26, and an elongated rear driven shaft 59 is rotatably journaled in an upright position in the rear bearing. Both of the intermediate and rear shafts provide lower ends downwardly extended from the frame 21.

A front sprocket 65 is connected to the output shaft 48. Upper and lower intermediate sprockets 66 and 67, of relatively larger and smaller diameters, respectively, are connected to the lower end of the intermediate shaft 56 with the upper sprocket being in a substantially common plane with the front sprocket. A still larger rear sprocket 69 is connected to the rear shaft 59 in a substantially common horizontal plane with the lower intermediate sprocket. A front chain 71 is extended around, and is in mesh with, the front and upper intermediate sprockets while a rear chain 72 is extended around, and is in mesh with, the lower intermediate and rear sprockets. With reference to FIG. 1, when the power take-off shaft 15 is rotated, the rear shaft 59 is rotated in a counter-clockwise direction, as indicated by the arrow 75. Because of the sprocket and chain drive described, and the gear ratios selected in preferred embodiments of the subject invention, the rear shaft is preferably driven at an angular speed of approximately twenty revolutions per minute even though the power take-off shaft rotates much faster. It is to be understood, however, that the invention is not limited to any precise speed, any suitable for the purpose being adopted.

A hub 80 is secured to the rear shaft 58, as best illustrated in FIGS. 2 and 3. Elongated arms 81, preferably of rectangular cross-section, are rigidly connected to the hub and are radially outwardly extended in circumferentially spaced relation from the hub. The arms are in a substantially common horizontal plane and, with the three arms illustrated, are preferably in approximately one hundred and twenty degree angularly spaced relation to each other about the hub. An elongated centering guide 82 provides an upper end connected to the hub and a lower tip 83. The guide is coaxially downwardly extended with respect to the driven rear shaft 59 and may be either rigid or flexible, as desired.

Clamps 90 are individually adjustably connected to the arms 81 for radial adjustment toward and away from the hub 80. Elongated shanks 91 provide upper portions 92 rigidly connected to, and downwardly extended from, the clamps. The shanks also include flat, lower mounting lugs 93. The lugs provide forward apertures, indicated at 95, and rearward arcuate slots 96 substantially concentric to their respective apertures. The shanks are selectively angularly adjustable at joints 97 about their respective axes. As shown in FIG. 4, the joints 97 include a plurality of circumferentially extended arcuate slots 98 to permit selective angular adjustment of the shanks 91 about their respective axes.

The subject implement 20 also includes a plurality of earth moving blades, illustrated as concavo-convex disks 100. Each disk has a substantially circular, peripheral edge 101 concentrically circumscribing an axis for the disk. Each disk has a forward concave surface 102 and a rear convex surface 103. Mounting arms 105 are rearwardly coaxially extended from the rear surfaces 103 of the disks and are individually pivotally connected to the mounting lugs 93 by pivot pins 107 perpendicularly extended through the mounting arms and apertures 95 in their respective lugs. Bolts 108 are extended through the arms and respective slots 96, and nuts 109 are screw-threadably connected to the bolts for maintaining the mounting arms and disks in selected positions of angular adjustment with respect to the shanks.

With particular reference to FIG. 1, it is noted that the disks 100 are in oblique angular relation to their respective arms 81; this horizontal angularity is adjusted at the joints 97. By making such an adjustment, the forward concave surfaces 102 of the disks are outwardly and forwardly directed with respect to the direction of rotation, indicated at 75, of the shaft 59. Adjustment of the arms 105 with respect to the lugs 93 by the bolts 108 and nuts 109 adjusts the elevational angularity of the axes, or the center, of the disks with respect to their arms. Further, the disks are in a progressively increased radial distance from the hub 80 as also best illustrated in FIG. 3. Therefore, the disks are individually, outwardly edgewardly contiguous to imaginary circles concentric to each other and to the hub. Additionally, the disks are downwardly edgewardly contiguous to a substantially common plane which is horizontal in the normal operating position of the implement, as visualized in FIG. 2.

A shaping blade 115 is also incorporated in the subject implement 20. The blade has upper and lower edges 116 and 117 respectively, an earth engaging side edge 118, an inner side edge 119, a front concave surface 121, and a rear convex surface 122. An elongated, angulated standard 125 provides a mounting end 126 rotatably received in a bushing 120 connected, as by welding to the shank 91 associated with one of the disks 100 and a supporting end 127 connected to the convex surface 122 of the blade. The blade is located rearwardly adjacent to one of the disks, as illustrated in FIG. 1. If the disks have the progressive spacing indicated above, the blade is rearwardly adjacent to the disk spaced the greatest distance from the hub. The blade is rearwardly outwardly inclined with its upper edge rearwardly outwardly spaced from its lower edge, with its earth engaging side edge inwardly, downwardly forwardly declined from the upper edge to the lower edge and substantially contiguous to the imaginary circle which is contiguous to the disk forwardly adjacent thereto, as described above. It is also believed evident that the concave surface of the blade is forwardly and outwardly directed with respect to the direction of rotation, indicated at 75, of the shaft 59.

A weighted, self-cleaning roller 135 includes an axle 136, a sleeve 137 journaled on the axle, collars 138 at opposite ends of the sleeve, and, preferably heavy cast rings 139 loosely rotatably mounted on the sleeve. A roller clamp 141 is radially adjustably mounted on one of the arms 105 outwardly of the clamp 90 to which the disk 100 on said arm is attached. It is to be noted that the roller clamp is not mounted on the same arm as the shaping blade 115 but is preferably on the arm immediately rearwardly adjacent to the shaping blade, with respect to the direction 75 of rotation of the rear shaft 59. An elongated mounting stem 142 includes a lower end 143 connected to the roller axle 136 and an upper angulated end 144 connected to the roller clamp. The roller is mounted on the arm by the stem in substantially radial relation to the hub 80 or rear shaft. Further, the roller is outwardly extended from the imaginary circle described above to which the outermost disk 100 is edgewardly contiguous. Further, the roller is spaced upwardly from said common plane to which the disks are downwardly edgewardly contiguous, as illustrated in FIG. 2. The axle of the roller is in a substantially horizontal position in the normal operating attitude of the implement, although it may be slightly tipped longitudinally thereof. The roller is elevationally adjustable in its clamp for a purpose to be evident from the following description of the operation of the subject implement 20.

*Operation*

The operation of the described embodiment of the subject invention is believed to be readily apparent and is briefly summarized at this point. Assuming that it is desired to form a ridge 150 of earth about an irrigation valve riser 151 having an upper open end 152, the tractor 10, with the implement 20 attached, is driven into the field and the implement is extended over the valve riser. During transporting of the implement, the lift arms 12 are preferably raised to, or close to, their highest positions. The tractor is driven rearwardly until the centering guide 82 is substantially coaxial with the valve riser 151 whereupon the lift arms are lowered until the implement is in the desired working position, as illustrated in FIG. 2.

The disks 100 are radially adjusted on their respective arms 81 so as to enable the formation of a ridge 150 of desired diameter. Also, the disks are angularly adjusted on their respective arms to achieve the desired oblique angularity and cant. Elevational adjustment is also provided for the shaping blade 115 and the roller 135, as required.

The rear shaft 59 is rotated by operation of the power take-off shaft 15 of the tractor 10. Thus, the disks 100 are motivated in substantially circular paths circumferentially of the rear shaft. Their forward concave surfaces 102 discharge earth encountered laterally outwardly into the ridge 150 which is likewise circular and substantially concentric to the rear shaft and to the valve riser 151. It is evident that in forming the ridge, a basin or reservoir 153 is provided within the ridge.

As the rear shaft 59 is rotated, the shaping blade 115 travels in a circular path and shapes the inside of the wall 155 of the ridge, as illustrated in FIG. 2. The blade also serves to pack the dirt more tightly in the ridge. The roller 135 travels in a circular path wherein it rides on the top surface 156 of the ridge to flatten and to compact the ridge. With the shaping blade and roller operating on the inside and top of the ridge, the inside wall and top surface are formed and meet in a relatively sharp upper, inner edge 157.

The shaft 59 is rotated continuously until a basin 153 of suitable volume is formed. Also, rotation is continued until the ridge is sufficiently compacted and shaped. Any clods remaining within the ridge following its formation is dissolved by water subsequently discharged into the basin so that a substantially flat bottom wall 160 is provided in the basin. When the ridge is completed as desired, the lift arms 12 are raised to lift the implement out of the basin formed. The tractor 10 is driven forwardly to move the implement over the top surface 156 of the ridge 150. The implement is then positioned over another valve riser 151 and a similar ridge formed therearound. Channels, not shown, are cut out of the ridges so formed to allow release of water stored in the basins into an adjacent irrigation ditch, also not shown.

From the foregoing it is evident that an earth shaping implement for forming an annular ridge of earth in circumscribing relation to a basin has been provided. The implement forms, shapes, and packs the earth in the ridge in such a manner that it effectively retains water stored therein. The implement is adjustable to vary the height, and width of the ridge and the diameter of the basin. Use of the subject implement minimized the labor, time and expense involved in forming the described basins.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desired to secure by Letters Patent is:

1. An agricultural implement for forming a basin in the ground and a substantially compact ridge of earth circumscribing the basin comprising a frame adapted to be supported in elevationally spaced relation to the ground; rotary mounting means rotatably borne by the frame for rotation about an upright axis of rotation; a plurality of concavo-convex disks having respective individual axes and peripheral edges substantially respectively concentric to said individual axes, and concave earth engaging surfaces; means supporting the disks on the mounting means in radially outwardly and circumferentially spaced relation to said axis of rotation with said individual axes obliquely angularly related to respective imaginary lines radially extended from said axis of rotation and intersecting respective ones of said individual axes, and with their concave surfaces facing in a generally common direction circumferentially of said axis of rotation; and a roller supported on the mounting means in substantially radial relation to said axis of rotation and in forwardly spaced relation to the concave surface of one of the disks with respect to the direction of rotation of said disks about said axis of rotation whereby the roller rides over and compacts the ridge formed by the disks.

2. An agricultural implement for forming a water-retaining basin in the ground with a ridge of earth circumscribing the basin comprising a frame adapted to be supported in elevationally spaced realtion to the ground; a shaft journaled in the frame in upright position and affording a first axis of revolution; means mounted on the frame and connected to the shaft for imparting rotation to the shaft in a predetermined direction of rotation; a plurality of arms borne by and radially outwardly extended from the shaft for rotary movement therewith, and concavo-convex disks individually mounted on the arms in upstanding positions downwardly spaced from their respective arms, the disks having individual axes and peripheral edges substantially concentric to respective individual axes, said axes being in angular relation to the arms mounting their respective disks, and the disks having concave, earth engaging surfaces facing in the direction of movement of the arms, wherein one of the disks is edgewardly outwardly contiguous to an imaginary circle circumscribing the shaft, and wherein all of the disks are edgewardly downwardly contiguous to a substantially common imaginary plane; wherein the implement includes a weighted roller having a respective axis of rotation; and wherein means are borne by the frame mounting the roller for circumferential movement about said first axis as well as rotation about said respective axis in a position of outward extension from said imaginary circle with its axis in substantially radial relation to the shaft and in upwardly spaced relation to said imaginary plane whereby the roller is adapted to ride on and press down against a ridge of earth formed by the disks.

3. The implement of claim 2 wherein the roller includes an axle connected to said roller mounting means and a plurality of rings loosely circumscribing the axle in side-by-side relation longitudinally of the axle.

4. An agricultural implement for forming a water-retaining basin in the ground with a ridge of earth circumscribing the basin comprising a frame adapted to be supported in elevationally spaced relation to the ground; a shaft journaled in the frame in upright position and affording a first axis of revolution; means mounted on the frame and connected to the shaft for imparting rotation to the shaft in a predetermined direction of rotation; a plurality of arms borne by and radially outwardly extended from the shaft for rotary movement therewith; and concavo-convex disks individually mounted on the arms in upstanding positions downwardly spaced from their respective arms, the disks having individual axes and peripheral edges substantially concentric to respective individual axes, said axes being in angular relation to the arms mounting their respective disks, and the disks having concave, earth engaging surfaces facing in the direction of movement of the arms, wherein one of the disks is edgewardly outwardly contiguous to an imaginary circle circumscribing the shaft; wherein the implement includes a scraper blade having opposite side edges, opposite upper and lower edges, and an earth engaging surface therebetween; and wherein means are borne by the frame mounting the blade for circumferential movement about said first axis of revolution in a position between a pair of circumferentially adjacent disks with its earth engaging surface facing in said direction of rotation, with its upper edge disposed outwardly of its lower edge, and with one of its side edges facing downwardly and being downwardly and inwardly declined from said upper edge to said lower edge, said declined side edge being also substantially contiguous to said imaginary circle.

References Cited in the file of this patent

UNITED STATES PATENTS

| | | |
|---|---|---|
| 1,182,961 | Beardall | May 16, 1916 |
| 2,004,154 | Beatty | June 11, 1935 |
| 2,244,774 | Hewitt | June 10, 1941 |
| 2,429,298 | Savage | Oct. 21, 1947 |
| 2,510,779 | Hancock | June 6, 1950 |
| 2,574,237 | Barrow | Nov. 6, 1951 |
| 2,619,017 | Stephenson | Nov. 25, 1952 |
| 2,651,246 | Peters et al. | Sept. 8, 1953 |
| 2,775,926 | Blackstock | Jan. 1, 1957 |
| 2,792,770 | Ober | May 21, 1957 |
| 2,991,838 | Lane | July 11, 1961 |

FOREIGN PATENTS

| | | |
|---|---|---|
| 619,713 | Great Britain | Mar. 14, 1849 |
| 549,450 | Italy | Oct. 13, 1956 |
| 576,621 | Italy | May 10, 1958 |